United States Patent
Yanagi

(10) Patent No.: US 8,831,838 B2
(45) Date of Patent: Sep. 9, 2014

(54) REAR WHEEL TOE ANGLE CONTROL SYSTEM

(75) Inventor: Takashi Yanagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 13/258,072

(22) PCT Filed: Mar. 5, 2010

(86) PCT No.: PCT/JP2010/001549
§ 371 (c)(1),
(2), (4) Date: Sep. 21, 2011

(87) PCT Pub. No.: WO2010/116605
PCT Pub. Date: Oct. 14, 2010

(65) Prior Publication Data
US 2012/0041649 A1  Feb. 16, 2012

(30) Foreign Application Priority Data

Mar. 30, 2009  (JP) ................ 2009-082327

(51) Int. Cl.
| | | |
|---|---|---|
| *B60R 22/00* | (2006.01) | |
| *E05F 15/00* | (2006.01) | |
| *G05D 1/00* | (2006.01) | |
| *B62D 7/15* | (2006.01) | |
| *B62D 7/14* | (2006.01) | |
| *B62D 17/00* | (2006.01) | |
| *B60G 17/015* | (2006.01) | |
| *B62D 5/04* | (2006.01) | |

(52) U.S. Cl.
CPC ............ *B62D 5/0496* (2013.01); *B62D 7/1581* (2013.01); *B62D 7/146* (2013.01); *B60G 2400/0523* (2013.01); *B60G 2400/25* (2013.01); *B62D 17/00* (2013.01); *B60G 2400/41* (2013.01); *B60G 2500/40* (2013.01); *B60G 17/015* (2013.01); *B60G 2400/204* (2013.01); *B60G 2200/44* (2013.01); *B60G 2400/33* (2013.01); *B60G 2400/39* (2013.01); *B60G 2400/842* (2013.01)
USPC ............................. 701/49; 701/41; 280/5.522

(58) Field of Classification Search
USPC ........... 701/22, 33.4, 37, 38, 41, 49; 180/402, 180/408, 412, 446; 280/5.506, 5.507, 5.52, 280/5.522, 86.75; 318/432, 434, 471, 473; 337/101, 102, 104, 333; 361/32, 33
See application file for complete search history.

(56) References Cited

U.S. PATENT DOCUMENTS

| | | | | |
|---|---|---|---|---|
| 4,611,682 | A * | 9/1986 | Yasuda et al. ................ | 180/446 |
| 6,334,503 | B1 * | 1/2002 | Fukumura et al. ............ | 180/446 |

(Continued)

FOREIGN PATENT DOCUMENTS

| | | |
|---|---|---|
| EP | 0 463 310 A1 | 1/1992 |
| JP | 60-035663 A | 2/1985 |
| JP | 7-112666 A | 5/1995 |
| JP | 9-030438 A | 2/1997 |
| JP | 2001339982 A * | 12/2001 |

(Continued)

*Primary Examiner* — Tuan C. To
*Assistant Examiner* — Isaac Smith
(74) *Attorney, Agent, or Firm* — Carrier Blackman & Associates, P.C.; William D. Blackman; Michael J. McCandlish

(57) ABSTRACT

An electric actuator (electric motor) is thermally protected without causing any unfamiliar impression in steering a vehicle. A temperature compensation gain computing unit (25) reduces the manipulated variable of the electric actuator (40L, 40R) by using a gain that diminishes with the rise in the temperature of the actuator.

7 Claims, 5 Drawing Sheets

(56) References Cited

U.S. PATENT DOCUMENTS

| | | |
|---|---|---|
| 7,516,965 B2 | 4/2009 | Horiuchi |
| 7,878,512 B2 | 2/2011 | Horiuchi et al. |
| 2005/0178606 A1 | 8/2005 | Husain et al. |
| 2008/0201037 A1* | 8/2008 | Suyama et al. ............... 701/36 |
| 2008/0203690 A1* | 8/2008 | Horiuchi et al. .......... 280/86.75 |
| 2008/0243339 A1* | 10/2008 | Nishimori et al. ............. 701/41 |
| 2011/0202239 A1 | 8/2011 | Maruyama et al. |

FOREIGN PATENT DOCUMENTS

| | | |
|---|---|---|
| JP | 2003-312509 A | 11/2003 |
| JP | 2008-055921 A | 3/2008 |
| JP | 2008-201168 A | 9/2008 |
| JP | 2008-201173 A | 9/2008 |
| JP | 2008-207684 A | 9/2008 |
| JP | 2008-221996 A | 9/2008 |

\* cited by examiner

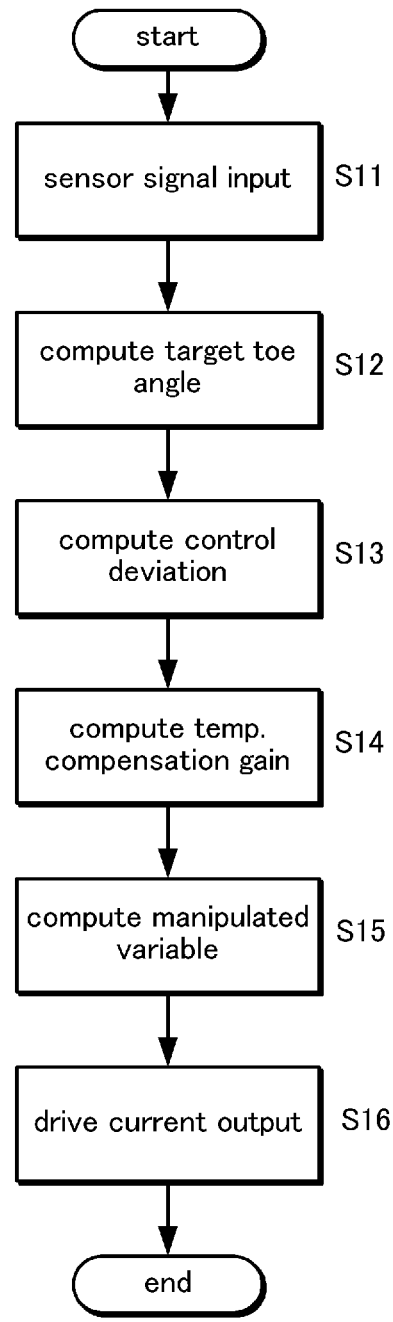

REAR WHEEL TOE ANGLE CONTROL SYSTEM

TECHNICAL FIELD

The present invention relates to a rear wheel toe angle control system that controls a rear wheel toe angle of a vehicle, and in particular to an electrically actuated rear wheel toe angle control system.

BACKGROUND OF THE INVENTION

For use in vehicles such as automobiles, rear wheel toe angle control systems are known that include an electric actuator connected between a vehicle body part and a wheel side member such as a knuckle, a hub carrier or the like of each rear wheel, and retracted and extended as required to variably adjust the toe angle of the corresponding rear wheel. See patent documents 1 and 2.

The rear wheel toe angle control system variably adjusts the toe angle of each rear wheel according to the steering condition of the front wheels and/or the running and operating conditions of the vehicle with the aim of improving the cornering performance and motion stability of the vehicle.

The electric actuator used for such a rear wheel toe angle control system typically consists of an electric motor and a feed screw mechanism. The rotational output of the electric motor is converted into a linear motion output by the feed screw mechanism.

When a vehicle equipped with a rear wheel toe angle control system using an electric actuator is operated under extreme conditions that may occur in motor racings, or that may be caused by incessant steering actions, because the rear wheel toe angle is changed frequently so as to correspond to the operating condition of the vehicle (front wheel steering condition), the load of the electric motor increases, and this causes the temperature of the brushes of the electric motor to rise. The rise in the temperature of the brushes may damage the performance and/or component parts of the electric motor, and may increase the possibility of the failure of the electric motor.

It may be possible to alleviate this problem by having the controller of the toe angle control system perform a protective logic in which the brush temperature of the electric motor is estimated from the motor electric current or detected by using a temperature sensor, and upon detection of a rise of the brush temperature to a prescribed motor protection temperature, after gradually returning the toe angle to zero, the operation of the electric motor is stopped. Once the brush temperature falls below the motor protection temperature, the normal toe angle control may be resumed. The toe angle is gradually returned to zero when the brush temperature has risen to the motor protection temperature because the vehicle may behave in an undesirable manner if the toe angle is quickly returned to zero.

PRIOR ART REFERENCE(S)

Patent Document(s)

Patent Document 1: JP09-030438A
Patent Document 2: JP2008-055921A

BRIEF SUMMARY OF THE INVENTION

Task to be Accomplished by the Invention

When such a control logic is executed, once the brush temperature has reached the prescribed motor protection temperature, the toe angle is gradually forced to zero angle under any operating condition, and this may create a certain inconvenience. Suppose that the toe angle is started to be returned to the neutral position while the vehicle is cornering. At the end of the cornering, the vehicle operator returns the steering wheel to the neutral position. However, if the toe angle has not been put to the neutral position by this time (at the end of the cornering), the vehicle travels obliquely in spite of the vehicle operator's intention to travel straight ahead so that the vehicle operator may experience some unfamiliar impression.

Also, because the toe angle control is abruptly resumed once the brush temperature falls below the motor protection temperature under any operating condition, the vehicle operator may again experience some unfamiliar impression.

A primary object of the present invention is to enable a thermal protection of an electric actuator (electric motor) for a rear toe control system to be performed, in an appropriate manner, without causing any unfamiliar impression to the vehicle operator in steering the vehicle.

Means to Accomplish the Task

The present invention provides a rear wheel toe angle control system for variably controlling a toe angle of each of left and right rear wheels of a vehicle by using an electric actuator, comprising: a target toe angle computing unit for computing toe angle target values of the rear wheels according to at least one of an operation manipulated variable entered by a vehicle operator or a dynamic state variable of the vehicle; a manipulated variable computing unit for computing a manipulated variable of the electric actuator according to the corresponding target value; an actuator temperature sensor for detecting a temperature of the electric actuator; and an actuator protection control unit for reducing the manipulated variable of each electric actuator according to a rise in the actuator temperature detected by the actuator temperature sensor.

In a preferred embodiment of the rear wheel toe angle control system of the present invention, the actuator protection control unit is configured to progressively reduce the manipulated variable with an increase in the temperature detected by the actuator temperature sensor.

In another preferred embodiment of the rear wheel toe angle control system of the present invention, the actuator protection control unit is configured to stop an actuation of the electric actuators when a temperature detected by the actuator temperature sensor has reached a prescribed temperature.

In yet another preferred embodiment of the rear wheel toe angle control system of the present invention, the actuator protection control unit is configured to variably set a control gain of the actuator so as to reduce the control gain in dependence on an increase in the temperature value detected by the actuator temperature sensor, the manipulated value being diminished with an appropriate selection of the control gain.

Effect of the Invention

According to the rear wheel toe control system of the present invention, the manipulated variable of the electric actuator is progressively reduced in keeping with the rise in the temperature of the electric actuator, instead of starting to reduce the manipulated variable of the electric motor to zero only after the temperature of the electric actuator has reached a protective temperature, so that the thermal protection of the electric actuator can be accomplished without causing any unfamiliar steering impression to the vehicle operator.

BRIEF DESCRIPTION OF THE DRAWINGS

FIG. 5 is a flowchart showing the process routine of the rear wheel toe angle control system.

DETAILED DESCRIPTION OF THE PREFERRED EMBODIMENT(S)

A rear wheel toe control system embodying the present invention is described in the following with reference to FIGS. 1 to 5.

Figure 1:
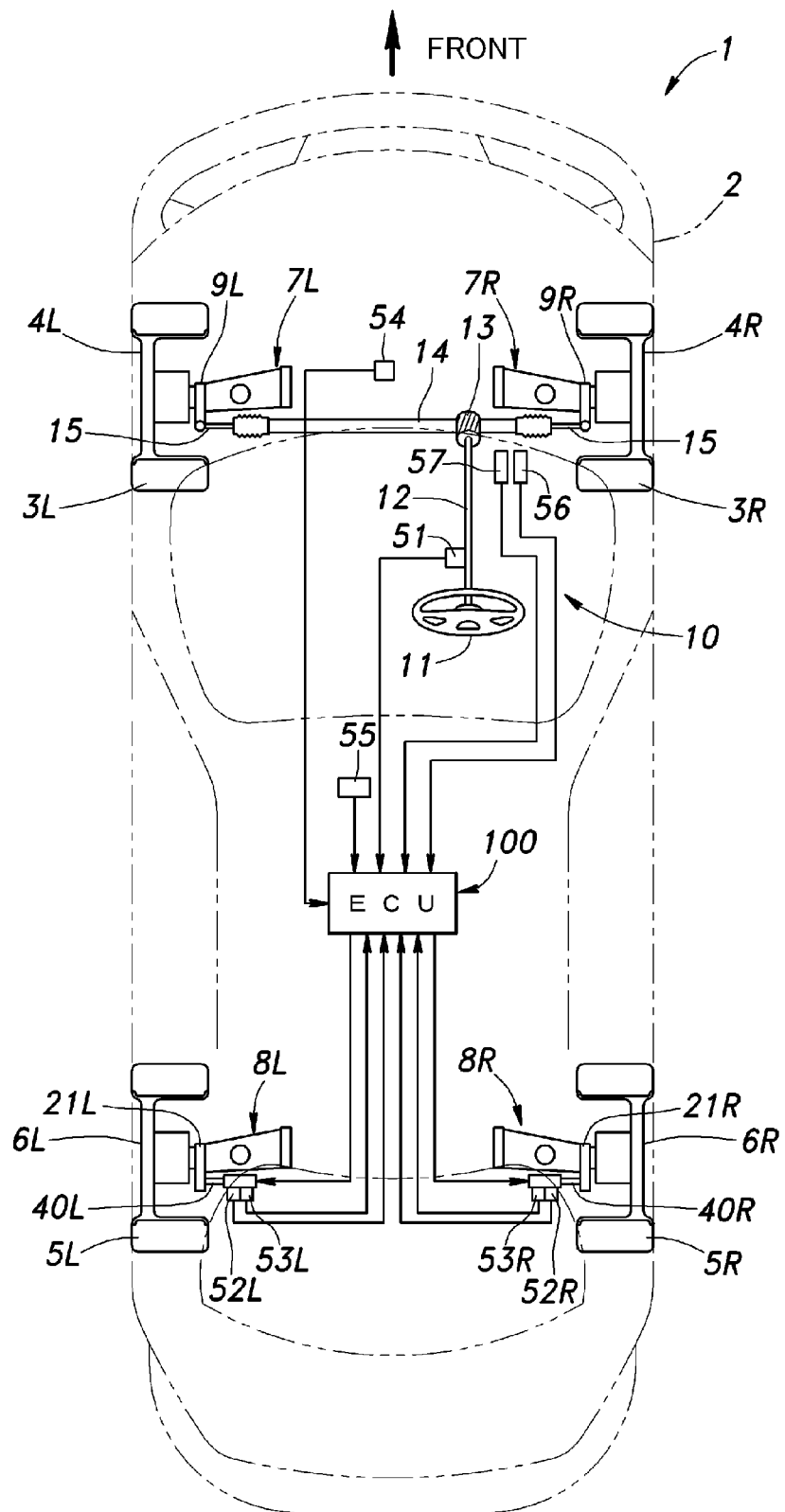
FIG. 1 is a diagram showing the overall structure of a four-wheeled vehicle incorporated with a rear wheel toe angle control system embodying the present invention.
Figure 2:
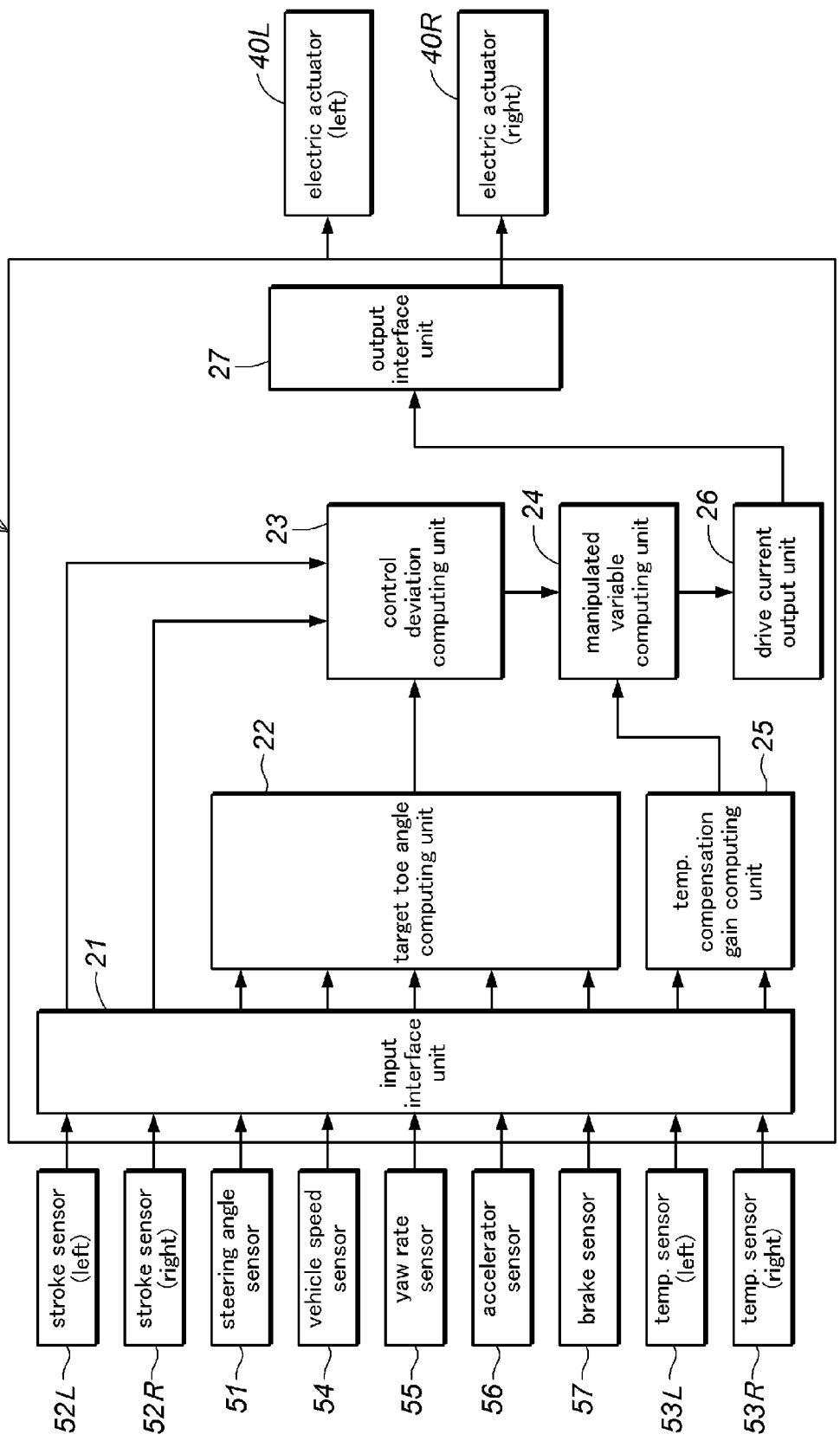
FIG. 2 is a block diagram showing the control system of the rear wheel toe angle control system.

First of all, a four wheeled vehicle incorporated with the rear wheel toe control system is described in the following with reference to FIG. 1.

The four-wheeled motor vehicle 1 comprises a pair of front wheels 4L and 4R, and a pair of rear wheels 6L and 6R. Each front wheel 4L, 4R is fitted with a tire 3L, 3R, and supported by the vehicle body via a corresponding front wheel suspension 7L, 7R so as to be steered with respect to the vehicle body via a corresponding knuckle 9L, 9R. Likewise, each rear wheel 6L, 6R is fitted with a tire 5L, 5R, and supported by the vehicle body via a corresponding rear wheel suspension 8L, 8R so as to be steered with respect to the vehicle body via a corresponding knuckle 21L, 21R.

The four wheeled motor vehicle 1 is further provided with a front wheel steering device 10 that directly steers the left and right front wheels 4L and 4R in dependence on the steering angle of a steering wheel 11. The front wheel steering device 10 comprises a steering shaft 12 connected to the steering wheel 11, a pinion 13 attached to the steering shaft 12 and a rack shaft 14 configured to reciprocate in a lateral direction and formed with teeth meshing with the pinion 13. The two ends of the rack shaft 14 are connected to the respective knuckles 9L and 9R via corresponding tie rods 15. The two front wheels 4L and 4R are thus steered as the steering wheel 11 is turned, and the rack shaft 14 is thereby actuated in the lateral direction.

The steering shaft 12 is provided with a steering angle sensor 51 for detecting the rotational angle of the steering wheel 11 as a steering angle that corresponds to the actual steering angle of the front wheels 4L and 4R. In the following description, it is assumed that the steering angle sensor 51 provides a sensor output signal representing the actual front wheel steering angle.

The four wheeled motor vehicle 1 is further provided with an electric actuator 40L for left wheel toe angle control having an end connected to a vehicle body part and the other end connected to the knuckle 21L of the left rear wheel 6L, and another electric actuator 40R for right wheel toe angle control having an end connected to a vehicle body part and the other end connected to the knuckle 21R of the right rear wheel 6R. Each electric actuator 40L, 40R comprises an electric motor (DC motor) and a feed screw mechanism. The rotational output of the electric motor is converted into a linear movement by the feed screw mechanism so that the toe angle of each rear wheel 6L, 6R can be individually varied by extending and retracting the output end of the electric actuator 40L, 40R.

Each electric actuator 40L, 40R is provided with a stroke sensor 52L, 52R for detecting an actual stroke of the output end of the electric actuator 40L, 40R, and a temperature sensor 53L, 53R for detecting a temperature of the electric motor of the electric actuator 40L, 40R.

The four wheeled motor vehicle 1 is provided with a vehicle speed sensor 54 for detecting a traveling speed of the vehicle, a yaw rate sensor 55 for detecting the yaw rate of the vehicle body, an accelerator sensor 56 for detecting the stroke of the accelerator pedal, and a brake sensor 57 for detecting the stroke of the brake pedal.

The left and right electric actuators 40L and 40R are controlled by a rear wheel steering control device (ECU) 100. The rear wheel steering control device 100 is an electronic device incorporated with a microcomputer, and comprises an input interface unit 21, a target toe angle computing unit 22, a control deviation control unit 23, a manipulated variable computing unit 24, a temperature compensation gain computing unit 25, a drive current output unit 26 and an output interface unit 27.

The target toe angle computing unit 22 computes the individual target values of the toe angles of the left and right rear wheels 6L and 6R according to a prescribed rear wheel toe angle control rule using the operation manipulated variables entered or inputted by the vehicle operator and the dynamic state variables of the vehicle, such as the front wheel steering angle detected by the steering angle sensor 51, the vehicle speed detected by the vehicle speed sensor 52, the yaw rate detected by the yaw rate sensor 55, the accelerator pedal stroke detected by the accelerator sensor 56 and the brake pedal stroke detected by the brake sensor 57. The target toe angle computing unit 22 converts the toe angle target values of the left and right rear wheels 6L and 6R into the target strokes of the left and right electric actuators 40L and 40R, respectively.

The control deviation unit 23 computes the control deviation given as a difference between the target stroke of each electric actuator 40L, 40R computed by the target toe angle computing unit 22 and the actual stroke of the corresponding electric actuator 40L, 40R detected by the corresponding stroke sensor 52L, 52R.

The manipulated variable computing unit 24 individually computes the manipulated variable of each electric actuator 40L, 40R so that the control deviation of the electric actuator 40L, 40R computed by the deviation computing unit 23 may be as small as possible by using a proportional control using a prescribed gain constant or the like.

Thereby, a tracking control is performed such that the toe angle of each rear wheel 6L, 6R is made to follow the target toe angle. As a mode of this tracking control, the toe in and toe out of the rear wheels 6L and 6R may be appropriately selected under each given condition by symmetrically operating the two electric actuators 40L and 40R. Alternatively, by extending one of the two electric actuators 40L and 40R and retracting the remaining electric actuator, the two rear wheels may be jointly steered in a desired direction. For instance, by taking into account the dynamic state of the vehicle indicated by the various sensors, the rear wheels 6L and 6R may be turned into a toe out condition when the vehicle is accelerating, and into a toe in condition when the vehicle is braking. Also, the two rear wheels 6L and 6R may be steered in the same phase as the front wheels when the vehicle is cornering at a high speed, and in the opposite phase from the front wheels when the vehicle is cornering at a low speed.

The temperature compensation gain computing unit 25 computes and sets a control gain or a temperature compensation gain that corresponds to the temperatures of the electric motors of the electric actuators 40L and 40R, and in particular computes the temperature compensation gain Gt according to the higher (actuator temperature Tacc) of the temperatures of the electric motors of the electric actuators 40L and 40R detected by the temperature sensors 53L and 53R.

Figure 3:
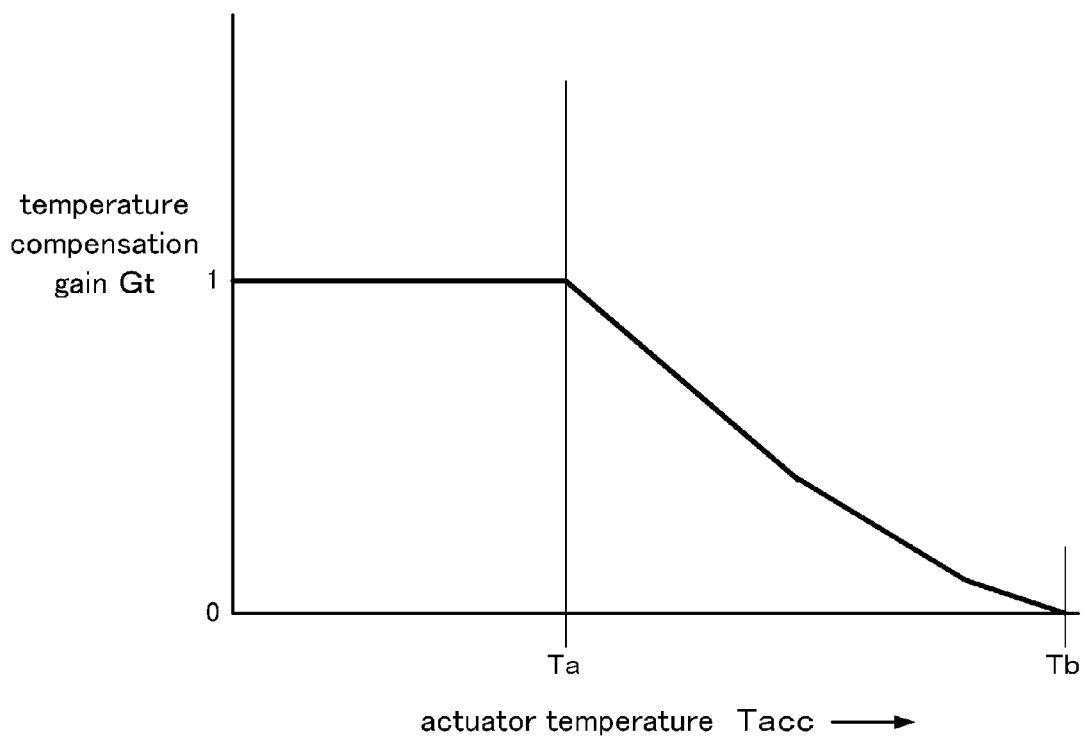
FIG. 3 is a graph showing the protection gain property of the rear wheel toe angle control system.

The temperature compensation gain Gt has a maximum value of 1, and a minimum value of 0. In particular, as shown in FIG. 3, the temperature compensation gain Gt is set as 1 when the actuator temperature Tacc is lower than an actuator protection start temperature Ta which is lower than an actuator protection temperature Tb by a prescribed amount, the actuator protection temperature Tb being determined from the tolerable temperature of the electric actuators 40L and 40R, and is progressively reduced to a smaller positive value as the actuator temperature Tacc rises higher above the actuator protection start temperature Ta. More specifically, the temperature compensation gain Gt starts progressively diminishing with the actuator temperature Tacc once the actuator temperature Tacc rises above the actuator protection start temperature Ta, and is reduced to zero when the actuator temperature Tacc has reached the actuator protection temperature Tb. In other words, the temperature compensation gain Gt decreases in proportion to the rise in the actuator temperature Tacc in the temperature range between the actuator protection start temperature Ta and the actuator protection temperature Tb.

The temperature compensation gain Gt is then forwarded to the manipulated variable computing unit 24 for computing the manipulated variable by multiplying the gain Gt, at the current temperature, (which acts as acts as a correction factor) by an initially calculated value of the manipulated variable. Thereby, the initially calculated manipulated variable is not temperature compensated when the temperature compensation gain Gt is 1 (Gt=1), is diminished by the factor of the temperature compensation gain Gt when the temperature compensation gain Gt is between 1 and 0 (1>Gt>0), and becomes zero when the temperature compensation gain Gt is zero (Gt=0). When Gt=0, the electric actuators 40L and 40R are not actuated at all. The temperature compensation gain Gt is common to (the same value for) both the left and right electric actuators 40L and 40R.

Figure 4:
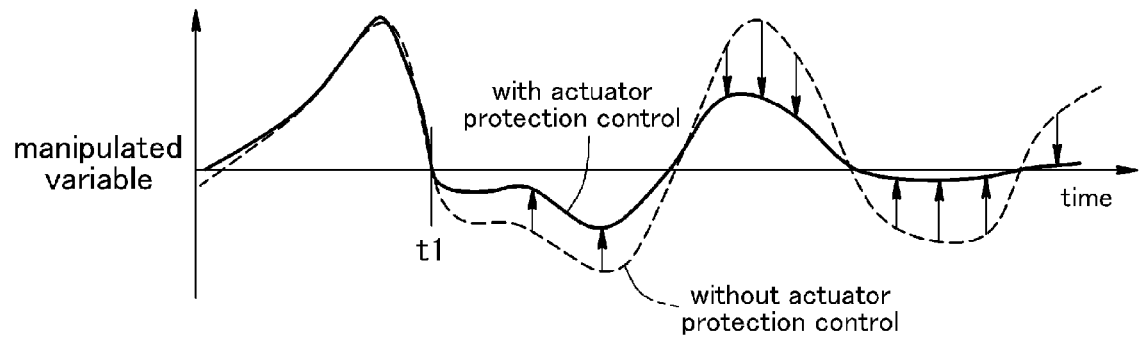
FIG. 4 is a time chart showing the operation property of the rear wheel toe angle control system.

FIG. 4 shows the changes in the manipulated variable of one of the electric actuators 40L and 40R. In FIG. 4, the broken line curve indicates the manipulated variable without the actuator protection control, and the solid line curve indicates the manipulated variable with the actuator protection control using the temperature compensation gain Gt. As shown in FIG. 4, until the actuator temperature Tacc rises and reaches the actuator protection temperature Tb (up to time point t1), the reduction of the manipulated variable for actuator protection is not performed. Once the actuator temperature Tacc rises above the actuator protection temperature Tb following the time point t1, the manipulated variable of the electric actuator 40L, 40R is reduced in relation with the temperature of the electric motor as compared with the case where no actuator protection is performed.

The temperature compensation gain computing unit 25 and manipulated variable computing unit 24 jointly form a means for performing the actuator protection control which reduces the manipulated variables of the two electric actuators 40L and 40R by a same amount, and the amount of the reduction of the manipulated variable is determined by the higher of the temperatures detected by the two temperature sensors 53L and 53R.

As discussed above, as the manipulated variables of the electric actuators 40L and 40R progressively diminish with the rise in the actuator temperature Tacc, the load of the electric actuators 40L and 40R decreases with the rise in the actuator temperature Tacc so that the electric actuators 40L and 40R can be thermally protected.

With the decrease in the manipulated variables of the electric actuators 40L and 40R, the toe angle control by the electric actuators 40L and 40R becomes less active. However, as the activity of the toe angle control is reduced gradually with the increased in the actuator temperature Tacc, the vehicle operator does not experience any unfamiliar impression in steering the vehicle.

Because the manipulated variables of the electric actuators 40L and 40R are reduced gradually with the rise in the actuator temperature Tacc, instead of reducing the manipulated variables of the electric actuators 40L and 40R suddenly to zero as soon as the actuator temperature Tacc of the electric actuators 40L and 40R has reached the actuator protection temperature Tb, the thermal protection of the electric actuators 40L and 40R can be appropriately effected without the vehicle operator experiencing any unfamiliar impression in steering the vehicle.

The process routine of the rear wheel toe angle control system embodying the present invention is described in the following with reference to FIG. 5. This process routine is called from the main program as an interrupt routine at a prescribed interrupt cycle.

First of all, the control device 100 receives sensor signals from the various sensors (step S11). The toe angle control target value of each rear wheel 6L, 6R is individually controlled according to a prescribed rear wheel toe angle control rule by using the sensor signals from the steering angle sensor 51, the vehicle speed sensor 52, the yaw rate sensor 55, the accelerator sensor 56 and the brake sensor 57, and is converted into the target stroke of each electric actuator 40L, 40R (step S12).

The control deviation or the different between the target stroke of each electric actuator 40L, 40R and the actual stroke of the corresponding electric actuator 40L, 40R detected by the corresponding stroke sensor 55L, 55R is computed (step S13).

Based on the higher of the temperatures indicated by the sensor signals of the temperature sensors 53L and 53R, the temperature compensation gain Gt is computed by using a temperature-gain map illustrated in FIG. 3 (step S14).

The same gain Gt is applied to the control deviations of the two electric actuators 40L and 40R, the manipulated variables for the electric actuators 40L and 40R are computed in a corresponding manner (step S15), and the drive currents corresponding to the manipulated variables are forwarded to the respective electric actuators 40L and 40R (step S16). Thereby, the electric actuators 40L and 40R are appropriately operated so that the designed toe control may be performed.

Although the present invention has been described in terms of a preferred embodiment thereof, it is obvious to a person skilled in the art that various alterations and modifications are possible without departing from the scope of the present invention. It should be noted that the temperature compensation gain property shown in FIG. 3 is only exemplary. For instance, the temperature compensation gain may be given by a parabolic curve in relation with the actuator temperature Tacc, and no greater than 1. As a matter of fact, the temperature compensation gain property may be appropriately selected depending on the nature of the temperature protection design of the actuator. The temperature of the electric motor of each electric actuator 40L, 40R may be estimated from the motor electric current, and the reduction in the manipulated variable may be corrected not only by the gain but also by other correction schemes.

GLOSSARY 6L, 6R left and right rear wheels
22 target toe angle computing unit
23 control deviation computing unit
24 manipulated variable computing unit
25 temperature compensation gain computing unit
40L, 40R electric actuator
52L, 52R stroke sensor
53L, 53R temperature sensor
100 rear wheel steering control device

The invention claimed is:

1. A rear wheel toe angle control system for variably controlling a toe angle of each of left and right rear wheels of a vehicle by using electric actuators, said toe angle control system comprising:
    a target toe angle computing unit for computing toe angle target values of the rear wheels according to at least one of an operation manipulated variable entered by a vehicle operator or a dynamic state variable of the vehicle;
    a manipulated variable computing unit for computing a manipulated variable of the electric actuators according to the corresponding target value;
    an actuator temperature sensor for detecting a temperature of the electric actuators; and
    an actuator protection control unit for reducing the manipulated variable of each electric actuator by multiplying an initially calculated value of the manipulated variable by a correction factor according to a rise in the actuator temperature detected by the actuator temperature sensor,
    wherein the actuator protection control unit is configured to progressively reduce the manipulated variable within a predetermined range of actuator temperatures, in correspondence with an increase in the temperature detected by the actuator temperature sensor, such that the correction factor is progressively reduced with the rise in actuator temperature,
    wherein the left and right rear wheels are respectively provided with individual electric actuators with individual actuator temperature sensors,
    and wherein the actuator protection control unit is configured to determine the correction factor according to a higher one of the two temperature values detected by the two actuator temperature sensors, the correction factor being common to the two electric actuators for the left and right rear wheels.

2. The rear wheel toe angle control system according to claim 1, wherein the actuator protection control unit is configured to stop an actuation of the electric actuators when a temperature detected by the actuator temperature sensor has reached a prescribed temperature.

3. The rear wheel toe angle control system according to claim 1, wherein the actuator protection control unit is configured to variably set a control gain of the actuator as the correction factor so as to selectively reduce the control gain in dependence on an increase in the temperature value detected by the actuator temperature sensor, the manipulated variable value being diminished with an appropriate selection of the control gain.

4. The rear wheel toe angle control system according to claim 3, wherein a value of the control gain is selected from a map, and is in a range between 0 and 1.

5. The rear wheel toe angle control system according to claim 1, wherein the system further comprises a yaw rate sensor.

6. A rear wheel toe angle control system for variably controlling a toe angle of each of left and right rear wheels of a vehicle by using electric actuators, said toe angle control system comprising:
    a target toe angle computing unit for computing toe angle target values of the rear wheels according to at least one of an operation manipulated variable entered by a vehicle operator or a dynamic state variable of the vehicle;
    a manipulated variable computing unit for computing a manipulated variable of the electric actuators according to the corresponding target value;
    an actuator temperature sensor for detecting a temperature of the electric actuators; and
    an actuator protection control unit for reducing the manipulated variable of each electric actuator by multiplying an initially calculated value of the manipulated variable by a correction factor according to a rise in the actuator temperature detected by the actuator temperature sensor, wherein the actuator protection control unit is configured to progressively reduce the manipulated variable within a predetermined range of actuator temperatures, in correspondence with an increase in the temperature detected by the actuator temperature sensor, such that within a specified temperature range, the value of the correction factor is progressively reduced with the rise in actuator temperature;
    wherein the actuator protection control unit is configured to variably set a control gain of the actuators as the correction factor so as to selectively reduce the control gain in dependence on an increase in the temperature value detected by the actuator temperature sensor, the manipulated variable being diminished with an appropriate selection of the control gain;
    wherein a value of the control gain is selected from a map, and is in a range between 0 and 1,
    wherein the left and right rear wheels are respectively provided with individual electric actuators with individual actuator temperature sensors,
    and wherein the actuator protection control unit is configured to determine the correction factor according to a higher one of the two temperature values detected by the two actuator temperature sensors, the correction factor being common to the two electric actuators for the left and right rear wheels.

7. The rear wheel toe angle control system according to claim 6, wherein the actuator protection control unit is configured to stop an actuation of the electric actuators when a temperature detected by the actuator temperature sensor has reached a prescribed temperature.

* * * * *